Dec. 10, 1929.    O. C. KAVLE    1,739,399
FRICTION CLUTCH
Filed Oct. 6, 1925
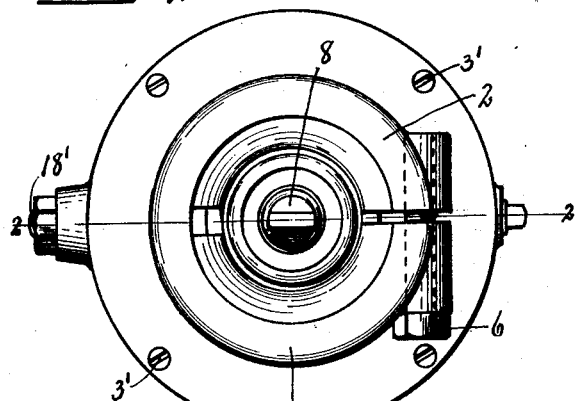
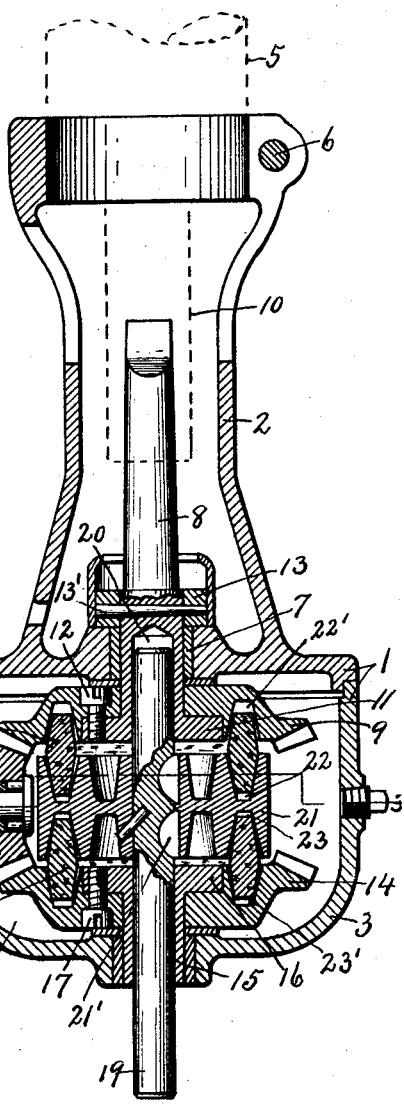
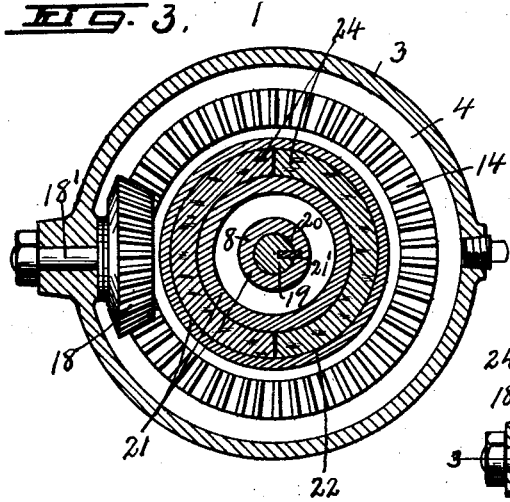
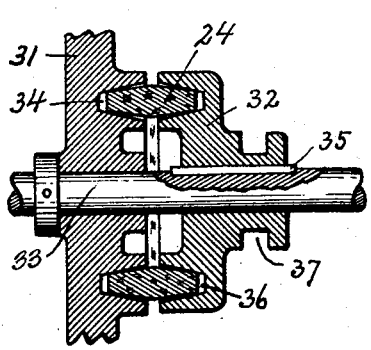
INVENTOR
O. C. Kavle
BY Denison & Thompson
ATTORNEYS
WITNESS
H. H. Hurst Patented Dec. 10, 1929

1,739,399

UNITED STATES PATENT OFFICE

OSCAR C. KAVLE, OF SYRACUSE, NEW YORK

FRICTION CLUTCH

Application filed October 6, 1925. Serial No. 60,770.

This invention relates to a friction clutch preferably of the reversing type adapted to be used more particularly in connection with drill presses, lathes, boring and tapping machines and the like but may be used in many other relations for transmitting rotary motion from one rotary element to another.

The main object is to provide a double cone friction element of resilient material such as cork or its equivalent for cooperation with opposed relatively rotatable driving and driven elements having conical sockets with which the opposite conical ends of the first-named element are adapted to engage and release as either of the second-named elements is moved axially in reverse directions and thereby to obtain a relatively large frictional contact surface in proportion to the diameter of the clutch elements.

Another object is to greatly increase the frictional grip between the resilient element and the driving and driven elements when brought into driving relation and also to expedite the grip and release of said elements when the driving and driven elements are moved axially in reverse directions relatively to each other.

Other objects and uses relating to specific parts of the device will be brought out in the following description.

In the drawings:

Figure 1 is a top plan or an end view of the device forming the subject of this invention as used in connection with a drill press or boring machine.

Figure 2 is a sectional view taken on line 2—2, Figure 1, the dotted lines indicating the supporting spindle for the head and the driving spindle for the tool holder.

Figure 3 is a horizontal sectional view taken in the plane of line 3—3, Figure 2.

Figure 4 is a sectional view of a modified form of double cone friction clutch adapted to be used in place of the usual motor vehicle clutch and in other relations.

The device shown in Figures 1, 2 and 3 comprises an upright axially movable head —1— consisting in this instance of a main upper section —2— and a cap section —3— secured together end to end by any suitable fastening means as screws —3'— to form a gear chamber —4—, the upper end of the upper section —2— being hollow and split radially through one side and is adapted to be clamped to an axially movable spindle —5— shown by dotted lines in Figure 2, said split side being provided with a clamping bolt —6— by which it may be fastened and released to and from the spindle —5—.

The lower end of the upright section —2— is provided with a journal bearing —7— in which is journaled the hub or shank —8— of a rotary driving element consisting in this instance of a bevel gear —9—, the upper end of the shank or spindle —8— being preferably tapered and secured in any well-known manner in the lower end of the usual rotary driving shaft —10— which may be centrally journaled in the spindle —5— to rotate relatively thereto and to move axially therewith in a manner well-known in drill presses.

The shank —8— extends vertically through a central opening in the gear —9— and is provided at its lower end with an annular flange —11— seated in a corresponding recess in the underside of the gear —9— and secured thereto by screws —12—, Figure 2, so that the shank and gear may rotate in unison, said gear being engaged with the underside of the upper section —2— to hold the gear and its supporting spindle against upward movement relatively to the head —1—.

A collar —13— is secured by a key —13'— to the intermediate portion of the shank —8— for engaging the upper portion of the bottom of the section —2— and thereby holding the shank and its gear —9— against downward displacement relatively to the head —1— while permitting the free rotation of said gear and shank in the bearing —7—.

A driven element consisting in this instance of a beveled gear —14— is provided with a hub —15— which is journaled in the lower side of the cap section —3— of the head —1— to rotate relatively thereto in the lower portion of the gear chamber —4— coaxial with the gear —9— but in vertically spaced relation thereto for a purpose presently described.

The hub —15— extends through a central opening in the gear —14— and is provided at its inner end with an annular flange —16— seated in a corresponding recess in the upper face of the gear —14— and secured thereto by screws —17—, Figure 2.

Rotary motion is transmitted from the gear —9— to the gear —14— by means of a pinion —18— which is journaled on a suitable stud —18'— on one side of the section —3— within the chamber —4— and also serves as a means for reversing the direction of rotation of said gears in a manner presently described.

A tool-supporting spindle —19— is extended upwardly thru a central opening in the hub —15— of the gear —14— and into a socket —20— in the hub or shank —8— of the gear —9— for relatively rotary and axial movement therein, the lower end of the spindle —19— being adapted to receive a chuck or equivalent device, not shown, but ordinarily used for holding a drill or similar tool.

A clutch element —21— is secured by suitable keys —21'— to the intermediate portion of the spindle —19— between the gears —9— and —14— for rotary and axial movement relatively to said gears and with the spindle —19— and is provided in its opposite ends with annular conical sockets —22— and —23—, both of substantially the same diameter and concentric with the axes of the spindle —19— and gears —9— and —14—.

The gears —9— and —14— are also provided with annular conical sockets —22'— and —23'— of substantially the same diameter as the sockets —22— and —23— and co-axial with their respective gears so that the open ends of the sockets —22— and —22'— and also the open ends of the sockets —23— and —23'— face each other.

The sockets —22— and —22'— are adapted to receive the opposite tapered ends of a double cone friction ring —24— while the sockets —23— and —23'— are adapted to receive the opposite tapered ends of a separate double cone friction ring —24'—.

These friction rings —24— and —24'— are made of resilient material such as cork or its equivalent which is compressible under pressure and returns to its normal size by its own resiliency, and are split diametrically for assembling.

Each of the sockets —22— and —22'— and —23— and —23'— is tapered from its open end at a greater angle than the adjacent tapered ends of the corresponding rings —24— and —24'— and their smaller ends are of slightly less width than the adjacent ends of the rings while their larger ends are of greater width than the adjacent portions of the rings so that when the clutch section —21— is moved axially in one direction from its medial position, the conical ends of the friction ring at that end will be wedged into and compressed by the walls of the corresponding socket and when moved axially in the opposite direction will produce a corresponding effect upon the other ring.

For example, assuming that the device is to be used for drilling, boring, tapping or reaming a piece of work and that the spindle —19— is provided with a tool chuck carrying a tool for the particular work required, under which conditions the spindle —8— will be rotated in one direction, as clockwise, by the shaft —10— which, together with the head —1— carrying the tool spindle —19—, will be moved axially to advance the tool into the work.

As previously stated the clutch element —21— and its supporting spindle —19— are free to move axially relatively to and between the gears —9— and —14— and constitutes what may be termed a floating clutch section of sufficient weight to cause it to automatically withdraw from engagement with the upper ring —24— and to lightly engage and be supported by the lower ring —24'— when the device is running idly at which time the gear —14— and possibly the members 24, 21 and 19 will be rotated in a counter-clockwise direction through the medium of the pinion —18— or if the inertia or resistance to rotation of the idling tool-spindle is sufficient to overcome the friction between the clutch members, the tool-spindle will be at rest.

Now as the tool is advanced into the work by the downward movement of the head —1— the resistance caused by the engagement of the tool with the work will press the spindle —19— and clutch element —21— upwardly thereby releasing the section —21— from the ring —24'— and at the same time pressing the upper ring —24— into frictional engagement with the walls of the sockets —22— and —22'— of the members —21— and —9— resulting in the rotation of the tool supporting spindle —19— and clutch member —21— in the same direction as the gear —9— and its supporting spindle —8— or in other words in a clockwise direction for causing the tool to enter the work.

On the other hand when the head —1— is raised thereby relieving the pressure of the tool holder —19— against the work, the friction of the tool with the work will tend to withdraw the spindle —19— and clutch section —21— downwardly thereby releasing the frictional engagement of the friction ring —24— from engagement with the gear —9— and simultaneously causing the frictional engagement of the section —21— with the friction ring —24'— which will be also forced into frictional engagement with the lower gear —14— and owing to the fact that the gear —14— will then be rotated in a counter-clockwise direction a similar directional rotation will be imparted to the section —21— and its supporting spindle —19— to facilitate the withdrawal of the tool from the work.

In other words, as the tool is forced into the work it is rotated in the direction of rotation of the driving spindle —8— or clockwise while the upward movement of the head —1— causes the tool to be withdrawn from the work with a counterclockwise motion, these operations being accomplished automatically through the floating member —21— and clutch rings —24— and —24'— in their co-operation with the reversely rotating gears —9— and —14—.

In Figure 4 is shown a simple form of clutch adapted to be used in motor vehicle transmission gearing and in other relations and comprising opposed relatively rotatable and co-axial clutch members —31— and —32— and a double cone clutch ring —24—, the clutch member —31— being loosely mounted on a shaft —33— and is provided with a conical annular groove —34— concentric with the shaft —33—.

The clutch member —32— is splined on the shaft —33— through the medium of a key —35— and is also provided with a conical annular groove —36— concentric with the axis of the shaft —33— and of substantially the same diameter as the groove —34—.

These grooves —34— and —36— face each other for receiving the adjacent conical ends of the clutch ring —24— which is similar to the clutch rings —24— and —24'— previously described.

The angles of the conical walls of the grooves —34— and —36— are slightly greater than the angles of the adjacent conical ends of the member —24— which is also made of cork or other resilient material capable of more or less compression by the wedging action of its ends into the corresponding grooves.

The hub of the member —32— is provided with an annular groove —37— for the reception of a shifting member, not shown, but by which said member may be moved axially for causing the member —24— to frictionally engage and to be released from engagement with the conical walls of the members —31— and —32— or, if desired, the clutch member —32— may be urged toward the section —31— by means of a spring commonly used in automobile clutches.

I claim:

1. In a friction clutch, axially opposed co-axial relatively rotatable clutch members having their adjacent ends each provided with radially spaced concentric friction surfaces, one of said members being movable axially toward and from the other member, a floating friction ring between said members and having each of its opposite ends provided with radially spaced concentric friction surfaces for frictional engagement with the adjacent friction surfaces of said members as the axially movable member is moved toward the other member.

2. A friction clutch as in claim 1 in which the concentric friction surfaces on opposite ends of the floating ring are convergent axially in opposite directions.

3. A friction clutch as in claim 1 in which the concentric friction surfaces on the adjacent ends of said members and also the concentric friction surfaces on opposite ends of the floating ring are convergent in opposite directions and the angle of convergence of the friction surfaces of the ring is less than the angle of convergence of the friction surfaces of said members.

In witness whereof I have hereunto set my hand this 29th day of September, 1925.

OSCAR C. KAVLE.